(12) United States Patent
Osada (10) Patent No.: US 8,451,499 B2
(45) Date of Patent: May 28, 2013

(54) MULTI-LEVEL IMAGE CONVERSION USING ERROR-DIFFUSION WITH IMPROVED SPEED BY PROCESSING QUADRANGULAR IMAGE SEGMENTS

(75) Inventor: Yoshihiro Osada, Osaka (JP)

(73) Assignee: KYOCERA Document Solutions Inc. (JP)

( * ) Notice: Subject to any disclaimer, the term of this patent is extended or adjusted under 35 U.S.C. 154(b) by 617 days.

(21) Appl. No.: 12/778,513

(22) Filed: May 12, 2010

(65) Prior Publication Data

US 2010/0309529 A1 Dec. 9, 2010

(30) Foreign Application Priority Data

Jun. 8, 2009 (JP) ................... 2009-137645

(51) Int. Cl.
*H04N 1/405* (2006.01)
(52) U.S. Cl.
CPC .................... *H04N 1/4052* (2013.01)
USPC ......................................... 358/3.03; 382/252
(58) Field of Classification Search
USPC ............ 358/1.9, 3.01, 3.03–3.06, 3.21–3.23, 358/3.26, 1.16, 448, 465, 534; 382/252; 345/616
See application file for complete search history.

(56) References Cited

U.S. PATENT DOCUMENTS 5,974,228 A 10/1999 Heitsch
2006/0110066 A1 5/2006 Tagawa et al.

FOREIGN PATENT DOCUMENTS

| JP | 2000-125122 | 4/2000 |
|---|---|---|
| JP | 2004-260770 | 9/2004 |
| JP | 2005-143140 | 6/2005 |
| JP | 2006-146672 | 6/2006 |
| JP | 2008-187408 | 8/2008 |

*Primary Examiner* — Scott A Rogers
(74) *Attorney, Agent, or Firm* — McDonnell Boehnen Hulbert & Berghoff LLP (57) ABSTRACT

An image processing apparatus includes a storage unit storing an image and a processing unit performing image processing in each segment of the stored image to obtain a value of each pixel in a predetermined order using calculation results for peripheral pixels processed. At least one segment is a quadrangular area. Two sides of the quadrangular area extend from a first vertex of two opposite vertices of the area toward two of subsequent pixels after a first pixel at the first vertex so that the area includes the subsequent pixels whose values are obtained using a calculation result for the first pixel. The other two sides extend from a second vertex of the two vertices toward two of previous pixels before a second pixel at the second vertex so that the area includes the previous pixels for which a value of the second pixel is calculated using calculation results.

19 Claims, 12 Drawing Sheets

Related Art

Related Art

F I G. 9

Related Art

FIG. 10A

Related Art

FIG. 10B

Related Art

FIG. 11A

Related Art

FIG. 11B

MULTI-LEVEL IMAGE CONVERSION USING ERROR-DIFFUSION WITH IMPROVED SPEED BY PROCESSING QUADRANGULAR IMAGE SEGMENTS

INCORPORATION BY REFERENCE

This application is based upon and claims the benefit of priority from the corresponding Japanese Patent application No. 2009-137645, filed Jun. 8, 2009, the entire contents of which is incorporated herein by reference.

FIELD OF THE INVENTION

The present invention relates to an image processing apparatus.

BACKGROUND OF THE INVENTION

Methods of converting image data into multi-level image data include error diffusion. Error diffusion is used to convert image data into, for example, binary image data.

In error diffusion, while an error generated by performing multi-level conversion on a certain pixel is being distributed to its neighboring pixels to be subjected to multi-level conversion, multi-level conversion is sequentially performed on pixels generally in the main scanning direction. Accordingly, errors diffused from pixels that have been subjected to multi-level conversion (hereinafter, also referred to as "processed pixels") are added to the original pixel value of a certain pixel and multi-level conversion is performed on the pixel having the resultant pixel value. There are various error diffusion methods, e.g., the Floyd-Steinberg method and the Burkes method, classified according to an error diffusion pattern.

Figure 8:
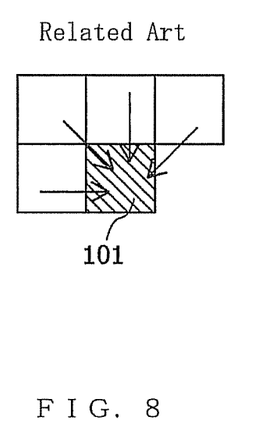
FIG. 8 is a diagram illustrating an error diffusion pattern according to the Floyd-Steinberg method.
Figure 9:
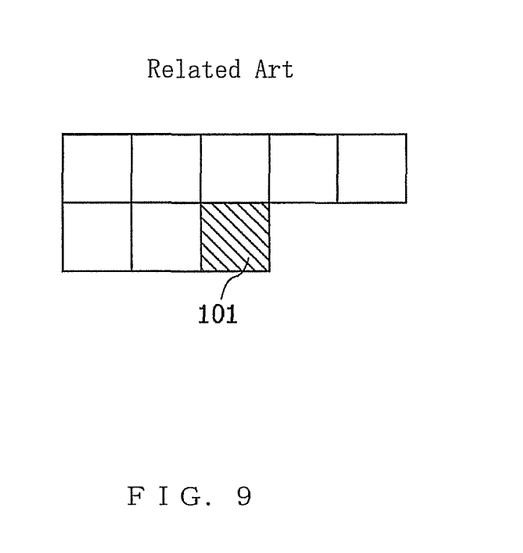
FIG. 9 is a diagram illustrating an error diffusion pattern according to the Burkes method.

In the Floyd-Steinberg method, as illustrated in FIG. 8, diffused errors are added to the original pixel value of a pixel 101 such that an error of the first previous pixel in the main scanning direction, an error of a pixel in the same position in the main scanning direction on the first previous line, and errors of pixels before and after the pixel in the same position on the first previous line, namely, the errors of the four pixels in total are added to the pixel value of the pixel. According to the Burkes method, as shown in FIG. 9, diffused errors are added to the original pixel value of the pixel 101 such that errors of the first and second previous pixels in the main scanning direction, an error of a pixel in the same position in the main scanning direction on the first previous line, errors of two pixels before the pixel in the same position on the first previous line, and errors of two pixels after the pixel in the same position on the first previous line, namely, the errors of the seven pixels in total are added to the pixel value of the pixel.

In a case where such image processing is performed by a dedicated circuit, such as an application specific integrated circuit (ASIC), image data is typically stored in a main memory. A line memory holding errors of one line for multi-level conversion is provided in the dedicated circuit. Multi-level conversion is performed on a line-by-line basis. In other words, errors obtained by performing multi-level conversion on a certain line are held by the line memory, errors to be diffused to pixels are calculated on the basis of the errors stored in the line memory upon multi-level conversion on the next line, and the pixels are subjected to multi-level conversion using the diffused errors.

Figure 10A:
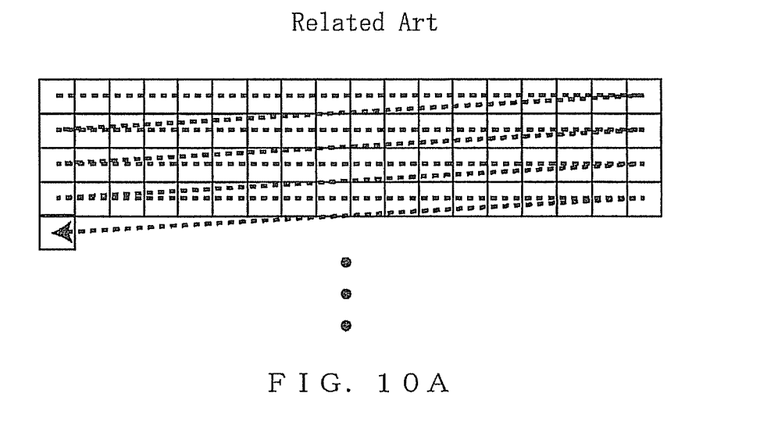
FIGS. 10A and 10B are diagrams each illustrating an order for multi-level conversion in an image.
Figure 10B:
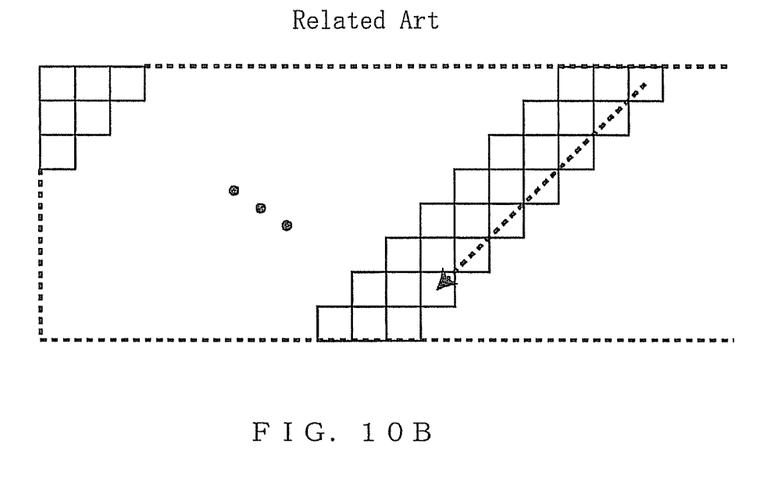

FIGS. 10A and 10B are diagrams each illustrating an order for multi-level conversion in an image. FIG. 10A illustrates the order in which multi-level conversion is implemented in the main scanning direction on a line-by-line basis. The conversion in this case requires a line memory having a size proportional to the number of pixels in the main scanning direction of image data. In FIG. 10B, multi-level conversion using the Floyd-Steinberg method is performed in a direction of 45 degrees on a band-by-band basis. The conversion in this case needs a line memory having a size proportional to the number of pixels in the height of each band.

In the case of FIG. 10A, therefore, the size of the necessary line memory is large. A memory element used in the line memory of the dedicated circuit, such as the ASIC, is more expensive than that in the main memory. Therefore, the cost of such an apparatus requiring a large line memory is increased. On the other hand, in the case of FIG. 10B, since the line memory sized according to the height of each band can be used, the cost of the apparatus is lowered.

Figure 11A:
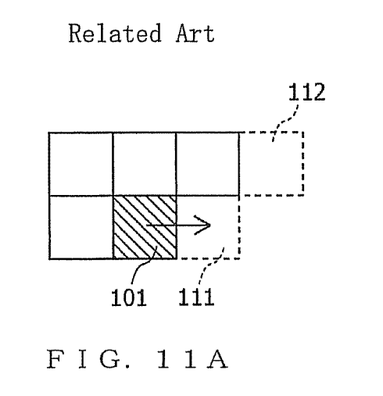
FIGS. 11A and 11B are diagrams each illustrating a pixel whose error has to be newly read from a memory for multi-level conversion on a next pixel.
Figure 11B:
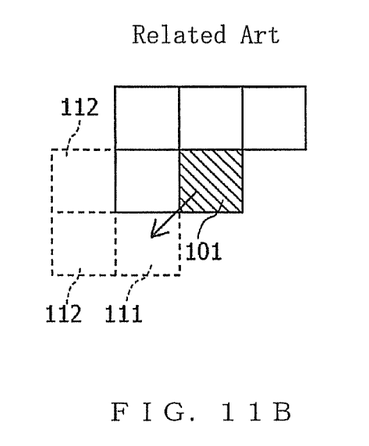

FIGS. 11A and 11B are diagrams each illustrating a pixel whose error has to be newly read from a memory for multi-level conversion on a next pixel. Referring to FIG. 11A, assuming that processing is performed in the order of FIG. 10A, when multi-level conversion is performed on a pixel 111 next to the pixel 101, an error value of one pixel 112 has to be newly read from the memory. As for error values of other pixels, the error values used for multi-level conversion on the pixel 101 can be used. Referring to FIG. 11B, assuming that the processing is performed in the order of FIG. 10B, when multi-level conversion is performed on the pixel 111 next to the pixel 101, error values of two pixels 112 have to be read from the memory. As for error values of other pixels, the error values used for multi-level conversion on the pixel 101 can be used.

As described above, performing multi-level conversion in the order of FIG. 10B increases the number of accesses to the memory. This causes a reduction in the rate of multi-level conversion. In the multi-level conversion in the order shown in FIG. 10B, therefore, the rate of multi-level conversion is reduced, though the line memory may have a small size.

Such a problem may occur in general image processing in which a value of each pixel in an image is obtained in a predetermined order using calculation results for its neighboring pixels that have been processed.

SUMMARY OF THE INVENTION

According to an aspect of the present invention, an image processing apparatus includes a storage unit that stores an image and a processing unit that performs image processing in each segment obtained by dividing the image stored in the storage unit. The image processing provides a value of each pixel in a predetermined order using calculation results from previously processed pixels surrounding the pixel. At least one of the segments is a quadrangular area. Two sides of the quadrangular area extend from a first vertex of two opposite vertices of the quadrangular area toward two pixels of subsequent pixels after a first pixel at the first vertex so that the quadrangular area includes all of the subsequent pixels whose values are obtained using a calculation result for the first pixel. The other two sides of the quadrangular area extend from a second vertex of the two opposite vertices toward two pixels of previous pixels before a second pixel at the second vertex so that the quadrangular area includes all of the previous pixels from which a value of the second pixel is calculated using calculation results.

According to another aspect of the present invention, there is provided a method of image processing, which includes storing an image and performing image processing in each segment obtained by dividing the stored image. The image processing provides a value of each pixel in a predetermined order using calculation results from previously processed pixels surrounding the pixel. At least one of the segments is a quadrangular area. Two sides of the quadrangular area extend from a first vertex of two opposite vertices of the quadrangular area toward two pixels of subsequent pixels after a first pixel at the first vertex so that the quadrangular area includes all of the subsequent pixels whose values are obtained using a calculation result for the first pixel. The other two sides of the quadrangular area extend from a second vertex of the two opposite vertices toward two pixels of previous pixels before a second pixel at the second vertex so that the quadrangular area includes all of the previous pixels from which a value of the second pixel is calculated using calculation results.

The various features of novelty that characterize the invention are pointed out in particularity in the claims annexed to and forming a part of this disclosure. For a better understanding of the invention, its operating advantages and specific objects attained by its uses, reference is made to the accompanying descriptive matter in which exemplary embodiments of the invention are illustrated in the accompanying drawings, in which corresponding components are identified by the same reference numerals.

BRIEF DESCRIPTION OF THE DRAWINGS

The following detailed description, given by way of example, but not intended to limit the invention solely to the specific embodiments described, may best be understood in conjunction with the accompanying drawings, in which.

DESCRIPTION OF THE PREFERRED EMBODIMENTS

Reference will now be made in detail to various embodiments of the invention, one or more examples of which are illustrated in the accompanying drawings. Each example is provided by way of explanation of the invention, and by no way limiting the present invention. In fact, it will be apparent to those skilled in the art that various modifications, combinations, additions, deletions and variations can be made in the present invention without departing from the scope or spirit of the present invention. For instance, features illustrated or described as part of one embodiment can be used in another embodiment to yield a still further embodiment. It is intended that the present invention covers such modifications, combinations, additions, deletions, applications, and variations that come within the scope of the appended claims and their equivalents.

Preferred embodiments of the IMAGE PROCESSING APPARATUS of the present invention will now be described in detail according to constitutional features.

Embodiments of the present invention will be described in detail below with reference to the drawings.

First Embodiment

Figure 1:
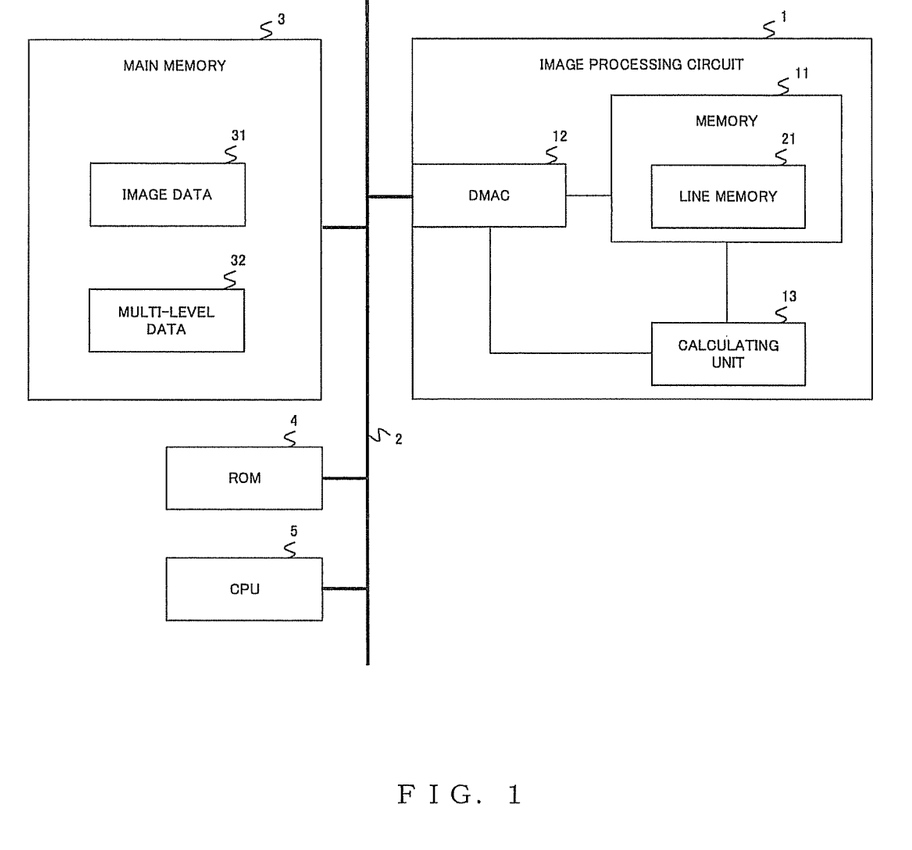
FIG. 1 is a block diagram illustrating the configuration of an image processing apparatus according to a first embodiment of the present invention.

FIG. 1 is a block diagram illustrating the configuration of an image processing apparatus according to a first embodiment of the present invention. Referring to FIG. 1, an image processing circuit 1 is a dedicated circuit for image processing and is connected to a bus 2. In addition, a main memory 3, a read only memory (ROM) 4, and a central processing unit (CPU) 5 are connected to the bus 2. A dynamic random access memory (DRAM) is used for the main memory 3.

The image processing circuit 1 is implemented by, for example, an ASIC. The image processing circuit 1 includes a memory 11, a direct memory access controller (DMAC) 12, and a calculating unit 13. The memory 11 includes a line memory 21 as a portion of its storage area. The memory 11 includes a static random access memory (SRAM) having a high access rate. The DMAC 12 is a circuit for reading and writing data from and to the main memory 3 through the bus 2 without using the CPU 5. The calculating unit 13 is a circuit that controls the DMAC 12 to read image data 31 from the main memory 3, performs multi-level conversion using error diffusion with the line memory 21, and controls the DMAC 12 to write the resultant multi-level data 32 into the main memory 3. The CPU 5 operates in accordance with a program stored in, for example, the ROM 4 to write the image data 31 into the main memory 3 and read the multi-level data 32 from the main memory 3.

Figure 2:
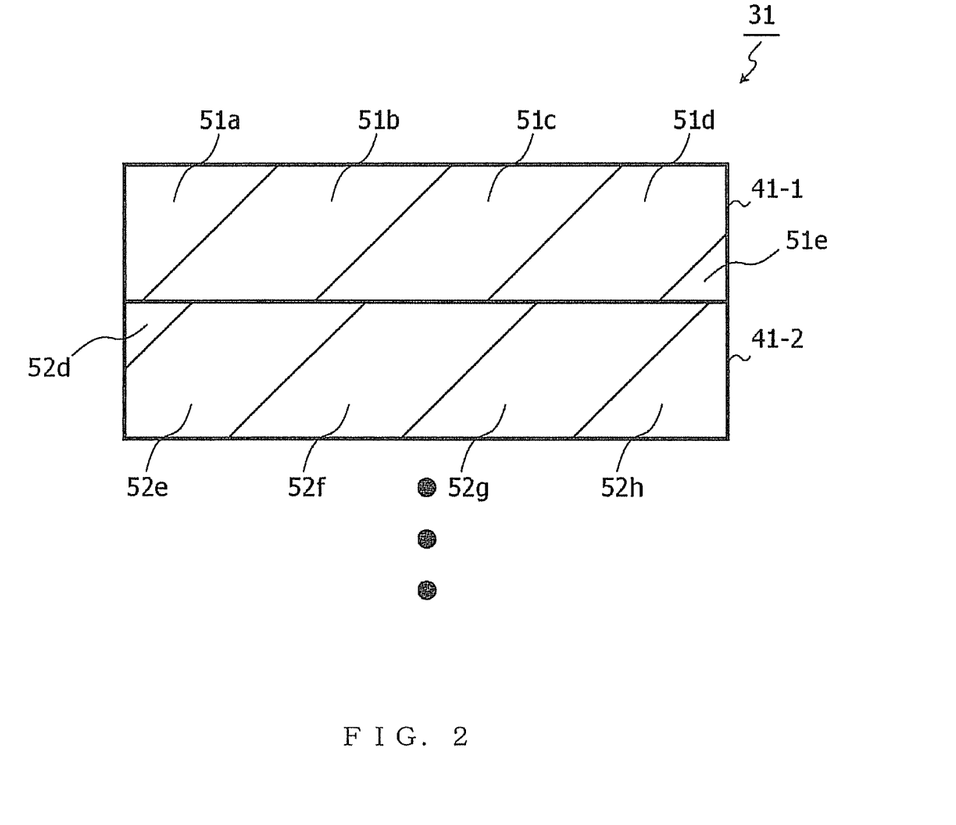
FIG. 2 is a diagram illustrating exemplary segments of an image based on image data in the first embodiment.

FIG. 2 is a diagram illustrating exemplary segments of an image based on the image data 31 in the first embodiment.

Figure 3:
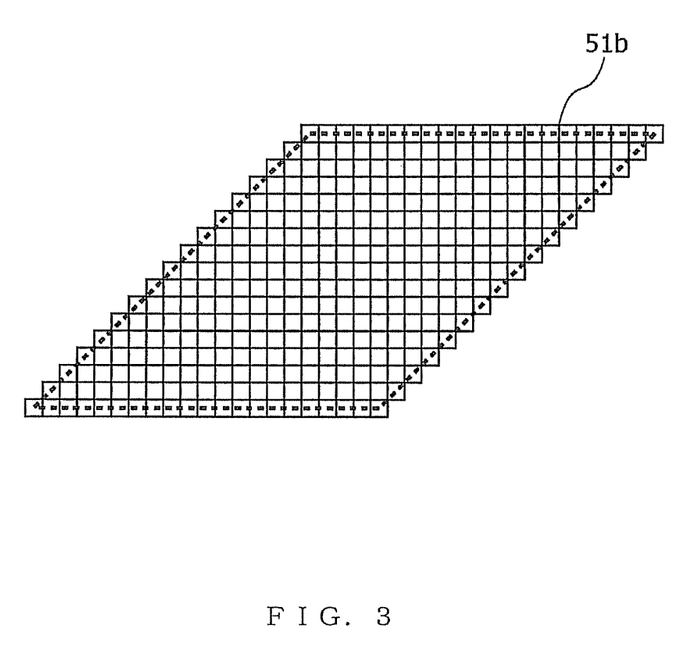
FIG. 3 is a diagram illustrating an exemplary arrangement of pixels in one of the quadrangular segments of FIG. 2.

In the first embodiment, the image is divided into a plurality of bands 41-1 and 41-2. The band 41-1 is divided into segments 51a to 51e and the band 41-2 is divided into segments 52d to 52h. In each band 41-i (i=1, 2, . . . ), some (for example, the segments 51b and 51c or 52f and 52g) of the segments (for example, the segments 51a to 51e or 52d to 52h) are quadrangular areas having the same shape. In this case, the segments 51b, 51c, 52f, and 52g are the quadrangular areas having the same shape. FIG. 3 depicts an exemplary arrangement of pixels in the quadrangular segment 51b of FIG. 2.

Figure 4A:
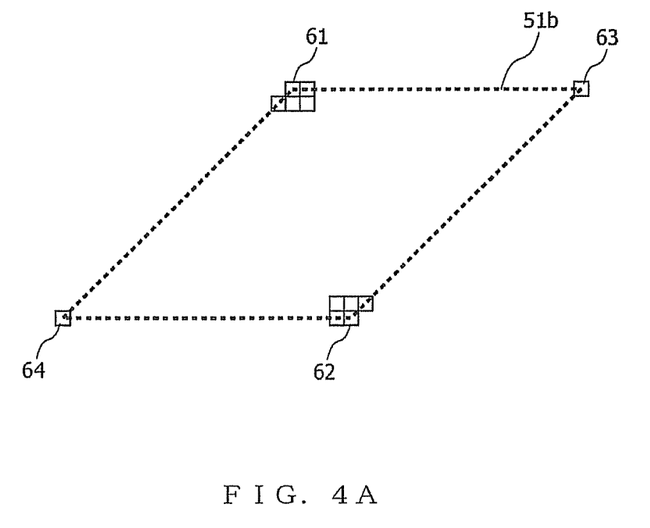
FIGS. 4A to 4C are diagrams further detailing the quadrangularly shaped segment of FIG. 3.
Figure 4B:
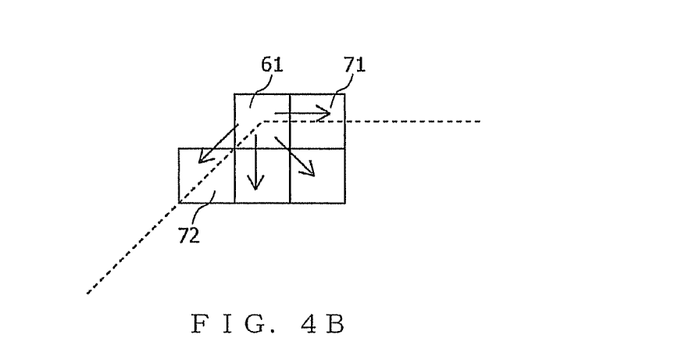
Figure 4C:
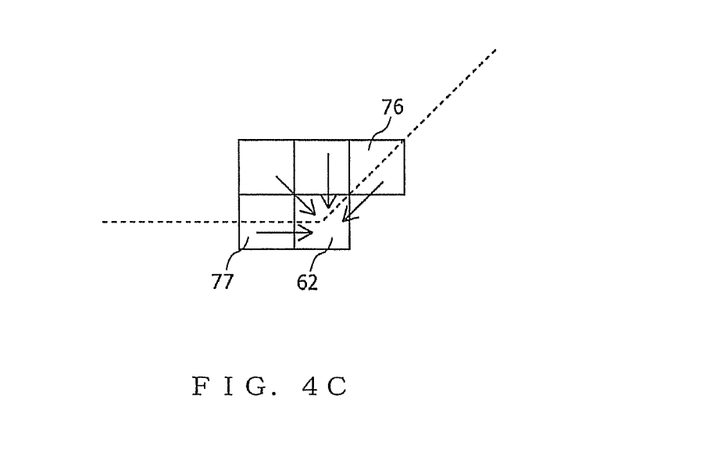

FIGS. 4A to 4C are diagrams providing further detail on the shape of the quadrangular segment 51b. As shown in FIG. 4A, pixels 61 to 64 positioned at four vertices of the quadrangular area are determined. In this embodiment of error diffusion, multi-level conversion is performed using the Floyd-Steinberg method, shown in FIGS. 8 and 10B. Accordingly, the shape of the quadrangular area is determined, as illustrated in FIGS. 4B and 4C. Assuming that the aspect ratio of each pixel is 1, the shape of the quadrangular area is a parallelogram in which two opposite vertices each have an angle of 135 degrees and the other two opposite vertices each have an angle of 45 degrees. The width of the quadrangular area is appropriately set and the height thereof is equal to that of the band 41-i. Referring to FIG. 4B, two sides of the quadrangular area extend from a first vertex of two opposite vertices of the quadrangular area toward two pixels 71 and 72 of subsequent pixels after the first pixel 61 at the first vertex so that the quadrangular area includes all of the subsequent pixels whose values are obtained using an error diffused from the pixel 61. Referring to FIG. 4C, the other two sides of the quadrangular area extend from a second vertex of the two opposite vertices toward two pixels 76 and 77 of previous pixels before the second pixel 62 at the second vertex so that the quadrangular area includes all of the previous pixels from which a value of the second pixel 62 is calculated using calculation results (namely, errors generated by multi-level conversion).

The operation of the above-described apparatus will now be described.

In the case where the image is divided into the bands 41-1 and 41-2 and the bands are divided into the segments 51a to 51e and the segments 52d to 52h, as shown in FIG. 2, multi-level conversion is performed on each of the segments in the following order: segment 51a, segment 51b, segment 51c, segment 51d, segment 51e, segment 52d, segment 52e, segment 52f, segment 52g, and segment 52h.

Figure 5:
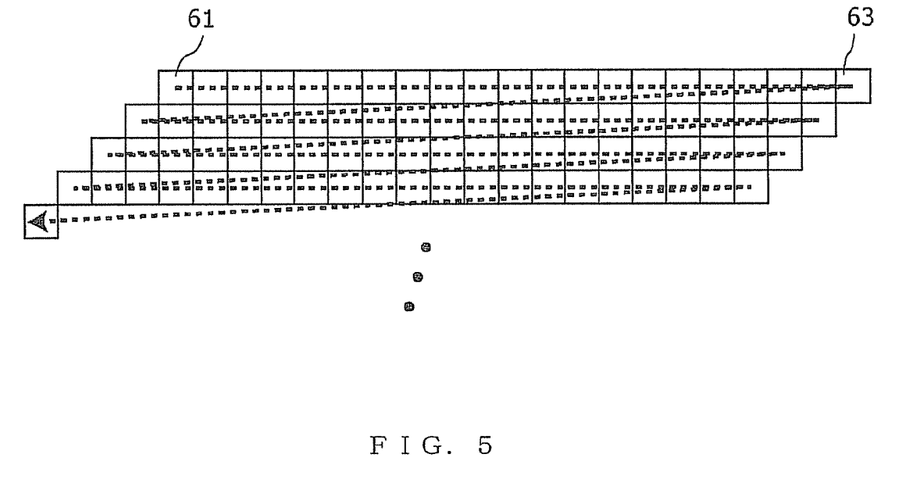
FIG. 5 is a diagram illustrating an order for multi-level conversion in the quadrangular segment.

In each segment, pixels are sequentially subjected to multi-level conversion in the main scanning direction on a line-by-line basis. When the conversion of one line is completed, multi-level conversion is performed in a line next to the processed line in the sub-scanning direction. FIG. 5 is a diagram illustrating an order for multi-level conversion in each of the segments 51b, 51c, 52f, and 52g, each serving as the quadrangular area.

To perform multi-level conversion on a target pixel in each line, the calculating unit 13 holds an error of the first previous pixel of the target pixel and also holds read errors of the previous line used for multi-level conversion on the first previous pixel. The calculating unit 13 reads errors of other pixels necessary for multi-level conversion on the target pixel from the line memory 21 and also reads a value of the target pixel from the main memory 3 using the DMAC 12. From these, the calculating unit 13 converts into multi-level data the sum of the sum of values (or diffused errors), obtained by multiplying the errors by a predetermined coefficient, and the value of the target pixel into multi-level data (refer to FIG. 11A).

Figure 6:
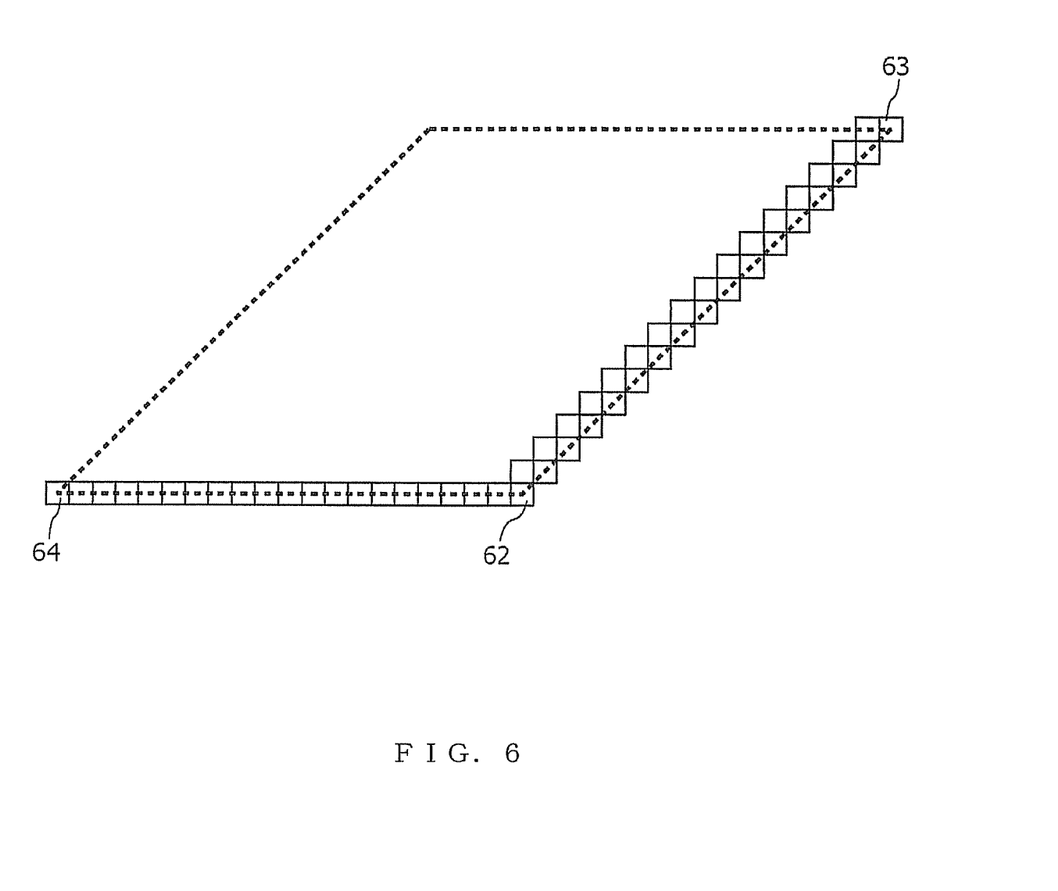
FIG. 6 is a diagram illustrating pixels whose errors generated on multi-level conversion in the segment are temporarily stored in a main memory.

The calculating unit 13 allows the main memory 3 through the DMAC 12 to temporarily store errors of pixels from the pixel 63 to the pixel 62 on the side of the segment (see FIG. 6), errors of the first previous pixels of these pixels, and errors of pixels from the pixel 64 to the pixel 62 on the side, and reads the errors using the DMAC 12 upon multi-level conversion in the subsequent segment. FIG. 6 is a diagram illustrating pixels whose errors generated by performing multi-level conversion (hereinafter, referred to as "multi-level conversion errors") are temporarily stored in the main memory 3. For example, the multi-level conversion errors of the pixels from the pixel 63 to the pixel 62 on the side of the segment 51b and those of the first previous pixels of these pixels are used for multi-level conversion on the pixels from the pixel 61 to the pixel 64 on one side of the segment 51c. The multi-level conversion errors of the pixels between the pixel 64 and the pixel 62 on the side of the segment 51b are used for multi-level conversion in the segments 52d and 52e.

As for a segment overlaid with no segment, like the segment 51b or 51c, the calculating unit 13 performs multi-level conversion on pixels on the upper side of the segment using errors diffused from the first previous line as zero.

As for a segment, such as the segment 51a, 51d, 51e, 52d, 52e, or 52h, whose shape is partially the same as another segment that is a quadrangular area, e.g., the segment 51b, 51c, 52f, or 52g, for example, the calculating unit 13 virtually arranges pixels having a value of zero in a missing portion of the quadrangular area and performs multi-level conversion in the segment in a manner similar to that in the quadrangular area.

As described above, according to the first embodiment, the calculating unit 13 divides an image into segments and performs multi-level conversion on pixels in each segment using error diffusion. At least one of the segments is a quadrangular area. Referring back to FIGS. 4B and 4C, the two sides of the quadrangular area extend from the first vertex of the two opposite vertices of the quadrangular area toward the two pixels 71 and 72 (namely, the pixels on both sides of the first vertex at an angle) of subsequent pixels after the first pixel 61 at the first vertex. As a result, the quadrangular area includes all of the subsequent pixels whose values are obtained using an error diffused from the first pixel 61. The other two sides of the quadrangular area extend from the second vertex of the two opposite vertices toward the two pixels 76 and 77 (namely, the pixels on both sides of the second vertex at an angle) of previous pixels before the second pixel 62 at the second vertex so that the quadrangular area includes all of the previous pixels which a value of the second pixel 62 is calculated using errors diffused from. As used above, the terms "after" and "before," regarding relative positioning of pixels, is referenced relative to a left-to-right main scanning direction and a top-to-bottom subscanning directions. In general, "after" refers to being to the right of a particular pixel in the same line or in a line below the line of the particular pixel. "Before" generally refers to being to the left of a particular pixel in the same line or in a line above the line of the particular pixel.

Thus, the size of the line memory 21 is proportional to the number of pixels on each line of a segment. In addition, the order of pixels to be processed in each segment is set so that the frequency of memory access is lowered. Advantageously, multi-level conversion can be achieved using error diffusion with a small-sized line memory at a low frequency of memory access.

Second Embodiment

According to a second embodiment, segments are set so that the last segment of a band 41-i and the first segment of the next band 41-(i+1) are combined into an area having the same shape as the above-described quadrangular area. In combining the last segment of the band 41-i with the first segment of the next band 41-(i+1), the calculating unit 13 performs the same calculation as that in another quadrangular area while interrupting error diffusion from the last segment of the band 41-i to the first segment of the next band 41-(i+1), thus performing multi-level conversion on pixels in the combination of the last segment of the band 41-i and the first segment of the next band 41-(i+1).

Figure 7A:
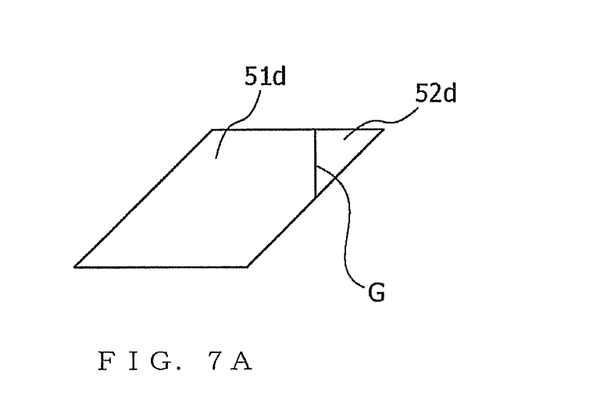
FIGS. 7A and 7B are diagrams each illustrating a combination of combined segments in a second embodiment of the present invention.
Figure 7B:
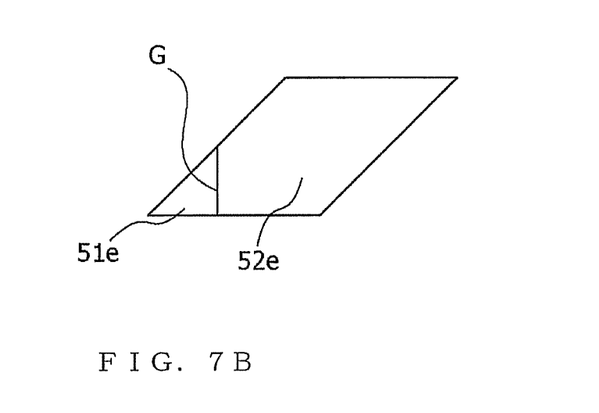

FIGS. 7A and 7B are diagrams each illustrating a combination of combined segments in the second embodiment. Assuming that segments are set as shown in FIG. 2, when the segment 51d of the band 41-1 is combined with the segment 52d of the band 41-2 as shown in FIG. 7A, the combination has the same shape as that of each of the segments 51b, 51c, 52f, and 52g. When the segment 51e of the band 41-1 is combined with the segment 52e of the band 41-2 as shown in FIG. 7B, the combination has the same shape as that of each of the segments 51b, 51c, 52f, and 52g.

Accordingly, the calculating unit 13 combines the segments 51d and 52d into one quadrangular area and also combines the segments 51e and 52e into one quadrangular area to perform multi-level conversion in each area. In this case, error diffusion is interrupted in the boundary G between the segments 51d and 52d. Specifically, pixels in the segment 52d are subjected to multi-level conversion on the condition that an error diffused from each pixel in the segment 51*d* is zero and pixels in the segment 51*d* are subjected to multi-level conversion on the condition that an error diffused from each pixel in the segment 52*d* is zero. Similarly, error diffusion is interrupted in the boundary G between the segments 51*e* and 52*e*. Specifically, pixels in the segment 52*e* are subjected to multi-level conversion on the condition that an error diffused from each pixel in the segment 51*e* is zero and pixels in the segment 51*e* are subjected to multi-level conversion on the condition that an error diffused from each pixel in the segment 52*e* is zero. The segments 51*d* and 52*d* sandwiching the boundary G are actually separated from each other in the bands 41-*i* and the segments 51*e* and 52*e* sandwiching the other boundary G are also actually separated from each other. If error diffusion is performed in the segments sandwiching the boundary G, an image may be disturbed.

The other components and operation of an image processing apparatus according to the second embodiment are the same as those in the first embodiment and explanation thereof is omitted.

As described above, according to the second embodiment, the last segment of a band and the first segment of the next band are combined into an area having the same shape as a quadrangular area. The calculating unit 13 performs the same calculation as that in the quadrangular area while interrupting error diffusion between the last segment and the first segment, thus obtaining values of pixels in the last segment and those in the first segment.

Consequently, the calculating unit 13 performs single-area processing that is the same as processing for a single quadrangular area on two segments. This results in an increase in processing speed.

The above-described embodiments are preferred embodiments of the present invention. It should be understood that the present invention is not limited to the embodiments and various changes and modifications thereof are possible without departing from the spirit and scope of the present invention.

For example, in the above-described embodiments, multi-level conversion based on error diffusion has been described. The present invention can also be applied to image processing in which a value of each pixel is obtained in a predetermined order using results of calculation for its surrounding pixels that have already been processed.

In addition, in the above-described embodiments, the Floyd-Steinberg method is used as error diffusion. Another method may be used. In this case, the shape of a quadrangular area is determined according to the method and pixels whose errors are temporarily stored in the main memory 3 are also determined according to the method.

In the above-described embodiments, the shape of an image is quadrangular. An image may have another shape.

The present invention can be applied to a device that performs binarization in an image forming apparatus, such as a multifunction peripheral or a printer.

What is claimed is:

1. An image processing apparatus comprising:
    a storage unit that stores an image; and
    a processing unit that performs image processing on each segment in a plurality of segments obtained by dividing the stored image, thereby obtaining a value of each pixel in a predetermined order using calculation results for previously processed pixels surrounding the pixel, wherein
    at least one of the segments is a quadrangular area,
    two sides of the quadrangular area extend from a first vertex of two opposite vertices of the quadrangular area toward two pixels of subsequent pixels after a first pixel at the first vertex so that the quadrangular area includes all of the subsequent pixels whose values are obtained using a calculation result for the first pixel, and
    the other two sides of the quadrangular area extend from a second vertex of the two opposite vertices toward two pixels of previous pixels before a second pixel at the second vertex so that the quadrangular area includes all of the previous pixels from which a value of the second pixel is calculated using calculation results.

2. The apparatus according to claim 1, wherein the processing unit performs multi-level conversion based on error diffusion to obtain the value of each pixel and uses an error accompanying the multi-level conversion as the calculation result.

3. The apparatus according to claim 2, wherein
    the storage unit holds errors corresponding to each pixel on at least the two sides extending from the second vertex, and
    the processing unit obtains a value of each pixel in an area adjoining the quadrangular area using the errors held in the storage unit.

4. The apparatus according to claim 2, wherein
    the image is divided into a plurality of bands, each band is divided into a plurality of segments, and at least one of the segments in each band has the same shape as that of the quadrangular area, and
    the processing unit obtains values of pixels in order in each segment in each band.

5. The apparatus according to claim 4, wherein
    a last segment in one of the bands and a first segment of the next band are combined into an area having the same shape as that of the quadrangular area, and
    while interrupting error diffusion between the last segment and the first segment, the processing unit performs the same calculation as that in the quadrangular area in the last segment and the first segment to obtain values of pixels in the last segment and the first segment.

6. The apparatus according to claim 2, wherein the processing unit includes an application specific integrated circuit (ASIC) and includes a line memory for holding the error, and wherein the line memory has a size proportional to the width of the quadrangular area.

7. The apparatus according to claim 6, wherein the storage unit includes a dynamic random access memory (DRAM) and the line memory includes a static random access memory (SRAM).

8. The apparatus according to claim 1, wherein the image is rectangular and the quadrangular area is a parallelogram.

9. The apparatus according to claim 8, wherein two opposite vertices of the parallelogram each have an angle of 135 degrees and the other two opposite vertices thereof each have an angle of 45 degrees.

10. A method of image processing, comprising:
    storing an image; and
    performing image processing on each segment in a plurality of segments obtained by dividing the stored image, to thereby obtain a value of each pixel in a predetermined order using calculation results for previously processed pixels surrounding the pixel, wherein
    at least one of the segments is a quadrangular area,
    two sides of the quadrangular area extend from a first vertex of two opposite vertices of the quadrangular area toward two pixels of subsequent pixels after a first pixel at the first vertex so that the quadrangular area includes all of the subsequent pixels whose values are obtained using a calculation result for the first pixel, and the other two sides of the quadrangular area extend from a second vertex of the two opposite vertices toward two pixels of previous pixels before a second pixel at the second vertex so that the quadrangular area includes all of the previous pixels from which a value of the second pixel is calculated using calculation results.

11. The method according to claim 10, wherein the image processing includes performing multi-level conversion based on error diffusion to obtain the value of each pixel and using an error accompanying the multi-level conversion as the calculation result.

12. The method according to claim 11, further comprising:
storing errors corresponding to each pixel on at least the two sides extending from the second vertex; and
obtaining a value of each pixel in an area adjoining the quadrangular area using the stored errors.

13. The method according to claim 11, further comprising:
dividing the image into a plurality of bands, each band being further divided into a plurality of segments, at least one of the segments in each band having the same shape as that of the quadrangular area, and
obtaining values of pixels in order in each segment in each band.

14. The method according to claim 13, further comprising:
combining a last segment in one of the bands and a first segment of the next band into an area having the same shape as that of the quadrangular area; and
while interrupting error diffusion between the last segment and the first segment, performing the same calculation as that in the quadrangular area in the last segment and the first segment to obtain values of pixels in the last segment and the first segment.

15. The method according to claim 11, wherein the errors are stored in a line memory in an application specific integrated circuit (ASIC), and wherein the line memory has a size proportional to the width of the quadrangular area.

16. The method according to claim 15, wherein the image is stored in a dynamic random access memory (DRAM) and the line memory includes a static random access memory (SRAM).

17. The method according to claim 10, wherein the image is rectangular and the quadrangular area is a parallelogram.

18. The method according to claim 17, wherein two opposite vertices of the parallelogram each have an angle of 135 degrees and the other two opposite vertices thereof each have an angle of 45 degrees.

19. An image processing apparatus comprising:
a storage unit that stores a rectangular image; and
a processing unit that performs image processing on each segment in a plurality of segments obtained by dividing the stored image, thereby obtaining a value of each pixel in a predetermined order using calculation results for previously processed pixels surrounding the pixel, wherein
at least one of the segments is shaped as a non-rectangular parallelogram area,
two sides of the area extend from a first vertex of two opposite vertices of the area toward two pixels of subsequent pixels after a first pixel at the first vertex so that the area includes all of the subsequent pixels whose values are obtained using a calculation result for the first pixel, and
the other two sides of the area extend from a second vertex of the two opposite vertices toward two pixels of previous pixels before a second pixel at the second vertex so that the area includes all of the previous pixels from which a value of the second pixel is calculated using calculation results.

* * * * *